United States Patent
Blanc et al.

(10) Patent No.: US 6,728,251 B1
(45) Date of Patent: Apr. 27, 2004

(54) SWITCHING APPARATUS COMPRISING A CENTRALIZED SWITCH CORE AND AT LEAST ONE SCAL ELEMENT(S) FOR THE ATTACHMENT OF VARIOUS PROTOCOL ADAPTERS

(75) Inventors: Alain Blanc, Tourrettes sur Loup (FR); Gerard Orengo, Biot (FR); Michel Poret, Gattieres (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/315,906

(22) Filed: May 20, 1999

(30) Foreign Application Priority Data

Aug. 28, 1998  (EP) .............................................. 98480056

(51) Int. Cl.$^7$ ............................................. H04L 12/28
(52) U.S. Cl. .............................. 370/395.7; 370/395.31; 370/413
(58) Field of Search ................................. 370/389, 391, 370/392, 394, 395.1, 398, 399, 395.3–395.72

(56) References Cited

U.S. PATENT DOCUMENTS

| | | | | |
|---|---|---|---|---|
| 5,287,358 A | * | 2/1994 | Nakayama ................... | 370/392 |
| 5,321,691 A | | 6/1994 | Pashan ....................... | 370/58.3 |
| 5,412,646 A | * | 5/1995 | Cyr et al. ................... | 370/411 |
| 5,440,550 A | | 8/1995 | Follett ........................ | 370/60 |
| 6,046,999 A | * | 4/2000 | Miki et al. .............. | 370/395.52 |
| 6,055,235 A | * | 4/2000 | Blanc et al. ................ | 370/389 |
| 6,122,253 A | * | 9/2000 | Jones ......................... | 370/235 |
| 6,269,081 B1 | * | 7/2001 | Chow et al. ................ | 370/241 |
| 6,337,860 B1 | * | 1/2002 | Wicklund ................... | 370/387 |
| 6,349,097 B1 | * | 2/2002 | Smith ......................... | 370/390 |

FOREIGN PATENT DOCUMENTS

| | | | | |
|---|---|---|---|---|
| EP | 0606729 A2 | 12/1993 | .......... | H04L/11/04 |
| EP | 0606729 A3 | 12/1996 | .......... | H04L/12/56 |
| EP | 0849973 A2 | 6/1998 | .......... | H04Q/11/04 |
| EP | 0849973 A3 | 12/1998 | .......... | H04Q/11/04 |
| JP | 06-244856 | 9/1994 | .......... | H04L/12/48 |
| JP | 06-244857 | 9/1994 | .......... | H04L/12/48 |
| JP | 7-500702 | 1/1995 | .......... | H04L/12/28 |

* cited by examiner

*Primary Examiner*—Hassan Kizou
*Assistant Examiner*—David Odland
(74) *Attorney, Agent, or Firm*—Carlos Munoz-Bustamante

(57) ABSTRACT

By appropriate arrangement of two sets of tables chosen to be complementary, cells which are conveyed through a first multiplexor, n RAM storages and the second are subject to a cell rearrange-ment enabling introduction of at least one bitmap field, thereby producing the n Logical Units. When two bytes which are processed in parallel have to be loaded at the same time in the same RAM storage, one particular byte is stored into one RAM available for a Write operation by use of the first set of tables, thereby causing an alteration to the normal association between the n RAMs and the n Logical Units which is then re-established by the second set of tables.

9 Claims, 4 Drawing Sheets

FIG. 2

PROTOCOL ADAPTER 4

| SRH1 | SRH2 | SRH3 | P1 | P2 | P3 | P4 | P5 | P6 | P7 | P8 | P9 | P10 | P11 | P12 | P13 | P14 | ... | | |

| | | | | | | | | | | | | | | | | | |
|---|---|---|---|---|---|---|---|---|---|---|---|---|---|---|---|---|---|
| LU0 | BM1 | BM2 | P4 | P8 | P12 | P16 | | | | | | | | | | | |
| LU1 | SRH1 | P1 | P5 | P9 | P13 | ... | | | | | | | | | | | |
| LU2 | SRH2 | P2 | P6 | P10 | P14 | | | | | | | | | | | | |
| LU3 | SRH3 | P3 | P7 | P11 | P15 | | | | | | | | | | | | |

FIG. 3

PROTOCOL ADAPTER 2

| SRH1 | SRH3 | P2 | P4 | P6 | P8 | P10 | P12 | P14 | P16 | | | | | | | | |
|---|---|---|---|---|---|---|---|---|---|---|---|---|---|---|---|---|---|
| SRH2 | P1 | P3 | P5 | P7 | P9 | P11 | P13 | P15 | ... | | | | | | | | |

FIG. 4

PROTOCOL ADAPTER 1

| SRH1 | P2 | P6 | P10 | P14 | P18 | P22 | P26 | P30 | P34 | P42 | P46 | P50 | P54 | P58 |
|---|---|---|---|---|---|---|---|---|---|---|---|---|---|---|
| SRH2 | P3 | P7 | P11 | P15 | P19 | P23 | P27 | P31 | P35 | P43 | P47 | P51 | P55 | P59 |
| SRH3 | P4 | P8 | P12 | P16 | P20 | P24 | P28 | P32 | P36 | P44 | P48 | P52 | P56 | P60 |
| P1 | P5 | P9 | P13 | P17 | P21 | P25 | P29 | P33 | P37 | P45 | P49 | P53 | P57 | P61 |

FIG. 5

| | | | | | | |
|---|---|---|---|---|---|---|
| LU0 | BM1 | BM2 | SRH1 | P2 | P6 | P10 |
| LU1 | BM1 | BM2 | SRH2 | P3 | P7 | P11 |
| LU2 | BM1 | BM2 | SRH3 | P4 | P8 | P12 |
| LU3 | BM1 | BM2 | P1 | P5 | P9 | ... |

SWITCHING APPARATUS COMPRISING A CENTRALIZED SWITCH CORE AND AT LEAST ONE SCAL ELEMENT(S) FOR THE ATTACHMENT OF VARIOUS PROTOCOL ADAPTERS

CROSS-REFERENCE TO RELATED PATENT APPLICATION

The following European Patent application numbers are cross-referenced:

European patent application no. 97480057.5 assigned to the Assignee of the present application describes with many details the general principle of SCAL elements in switching architectures.

European patent application no. 97480098.9 permits substantially enhancing the multicasting possibilities of the switching architecture.

TECHNICAL FIELD OF THE INVENTION

The invention relates to switching systems and, more particularly, to a switching apparatus comprising a centralized Switch Core and at least one Switch Core Access Layer (SCAL) element(s) for the attachment of various Protocol Adapters.

BACKGROUND ART

Shared buffer switches have shown to be of great interest for switching small packets of data and are well adapted to the switching of Asynchronous Transfer Mode (ATM) cells although they are not limited to the ATM technology. Basically, a shared buffer switch comprises a cell storage which is used for storing the cells presented on one input port of the Switch. An appropriate mechanism is used for extracting the cell from the shared buffer and for directing the latter to one or more output ports of the switch. By using different output queues, each one dedicated to one output port of the switch, it is made possible to achieve a very simple multicasting effect in the switching process.

An important aspect of modern switches resides in their capability to permit attachment of a great number of Protocol Adapters which are located at different areas, generally remote, with respect to the Switch Core. A technique used for achieving this goal is based on the provision of Switch Core Access Layers (SCAL) elements which are distributed at different areas and to which are connected the Protocol Adapters.

In order to enhance multicasting capability, SCAL elements were given an additional important function. They introduce a specific processing in the cell for preparing the latter to the switching process within the centralized Switch Core. This is based on the introduction within the cell of a specific field, a so called bitmap which is reserved for receiving at appropriate time a particular value for controlling the routing process. More particularly, the bitmap field is assigned its first actual value when the cell enters the switch core, and also at the output of the latter, before the cell is transmitted again to the SCAL element (i.e., the transmit part of the SCAL).

Another aspect of modern switches resides in their capacity to allow attachments of a great variety of Protocol Adapters, operating at different speeds or different formats of cells (particularly the size of the cell may differ). This is more particularly true as the switching rate will continuously increase, resulting in the coexistence of modern adapters and more classical ones.

At last, the SCAL elements must be adapted to the structure of high-speed modern Switch cores, and particularly those operating in speed expansion. The speed expansion is a technique that was designed in switching systems for going over the possibilities and physical limitations of a given technology. Speed expansion permits switching rates of more than 1 Giga bps. This is achieved by an effective combination of several distinctive individual switching modules together (e.g., four modules) in order to form an aggregate high-rate Switching structure or Switch Core. For that purpose, the cell is divided in Logical Units (LU) which are separately transported to the centralized Switch Core, and each Logical Unit is directed to one dedicated switching module. By means of an appropriate mechanism, the four modules can be coupled and synchronized under the control of a master module which permits simultaneously routing the four LUs towards a same destination port, thus allowing the routing of the whole cell. This obviously permits an increase of the overall switching speed, although the semiconductor technology remains unchanged. A detailed description of this architecture can be found in European application no. 97480057.5 and no. 97480056.7, which contents are herein incorporated by simple reference.

It results from the observations above that the SCAL elements are essential features of modern switching architectures. They play key functions and, therefore, most aspects of the switching systems depend on the efficiency of the SCAL elements. There is a strong desire for a SCAL element that allows attachment of a wide number of different Protocol Adapters, having different format and speed characteristics, and supporting the increasing speed of the speed expansion technique. The SCAL should additionally permit an easy introduction of the bitmap field which is now an essential requirement in modern switches.

SUMMARY OF THE INVENTION

It is an object of the present invention to provide a Switch Core Access Layer (SCAL) element that is versatile enough to permit attachment of a great number of different Protocol Adapters having characteristics of different speeds and formats.

It is another object of the invention to provide a programmable remote SCAL element for interfacing a Switch Core and allowing high speed transmissions.

It is still another object of the invention to provide a SCAL element permitting attachment to one or more Protocol Adapters at the same time, and providing the introduction of a bitmap field without jeopardizing the speed rate.

These and other objects of the invention are achieved by the switching apparatus comprising a centralized Switch Core and at least one SCAL element for the attachment of various Protocol Adapters in accordance with the present invention. Basically, the Switch Core and the SCAL communicate with each other via n parallel serial links with each one transmitting a Logical Unit. Each SCAL comprises in both the receive and the transmit part at least one input for receiving cells from said Protocol Adapter; a set of n FIFO queues for storing the cells into n parallel busses; and a set of n RAM storages, with each RAM being associated with one Logical Unit.

First multiplexing means receives the contents of the parallel busses for performing simultaneously n WRITE operations into the n RAM storages under control of a first set of n tables. There is provided second multiplexing means for making READ operations from said n RAM storages under control of a second set of n tables. By appropriate arrangement of the two sets of tables, which are chosen complementary, the cells which are conveyed through the first multiplexing means, the RAMs and the second multiplexing means are subject to a cell rearrangement that includes a bitmap field introduction and that produces the n Logical Units.

When two bytes which are processed in parallel have to be loaded at the same time in the same RAM storage because they are intended to be transported into a same associated Logical Unit, one particular byte is accidentally stored into one RAM available for a Write operation by means of said first set of tables. This causes an alteration to the normal association between the n RAMs and the n Logical Units, which alteration is re-established by means of the second set of tables.

Preferably, the number of Logical Units is fixed to four, which is also the number of the RAMs. In a preferred embodiment, the first multiplexing means is controlled by means of a set of four control Registers, with each register comprising a first field (MUXc) defining in which RAM the associated input byte will be written, a second field (OFFSET) defining the particular location to store said byte, and a third field for storing an incrementing value (WAR) characterizing the cell buffer. For each cycle, the first and second field of said control registers are provided by said first set of tables.

This has the strong advantage of allowing the use of every clock cycle since four parallel write operations and four parallel read operations can always be executed.

BRIEF DESCRIPTION OF THE DRAWINGS

FIGS. 2, 3 and 4, respectively, illustrate the cell rearrangement process that is required in the SCAL element for different adapters, having different speed.

FIG. 5 illustrates the structure of the Logical Unit when the four switching modules are not in a master/slave configuration.

DESCRIPTION OF THE ILLUSTRATED EMBODIMENT OF THE INVENTION

Figure 1:
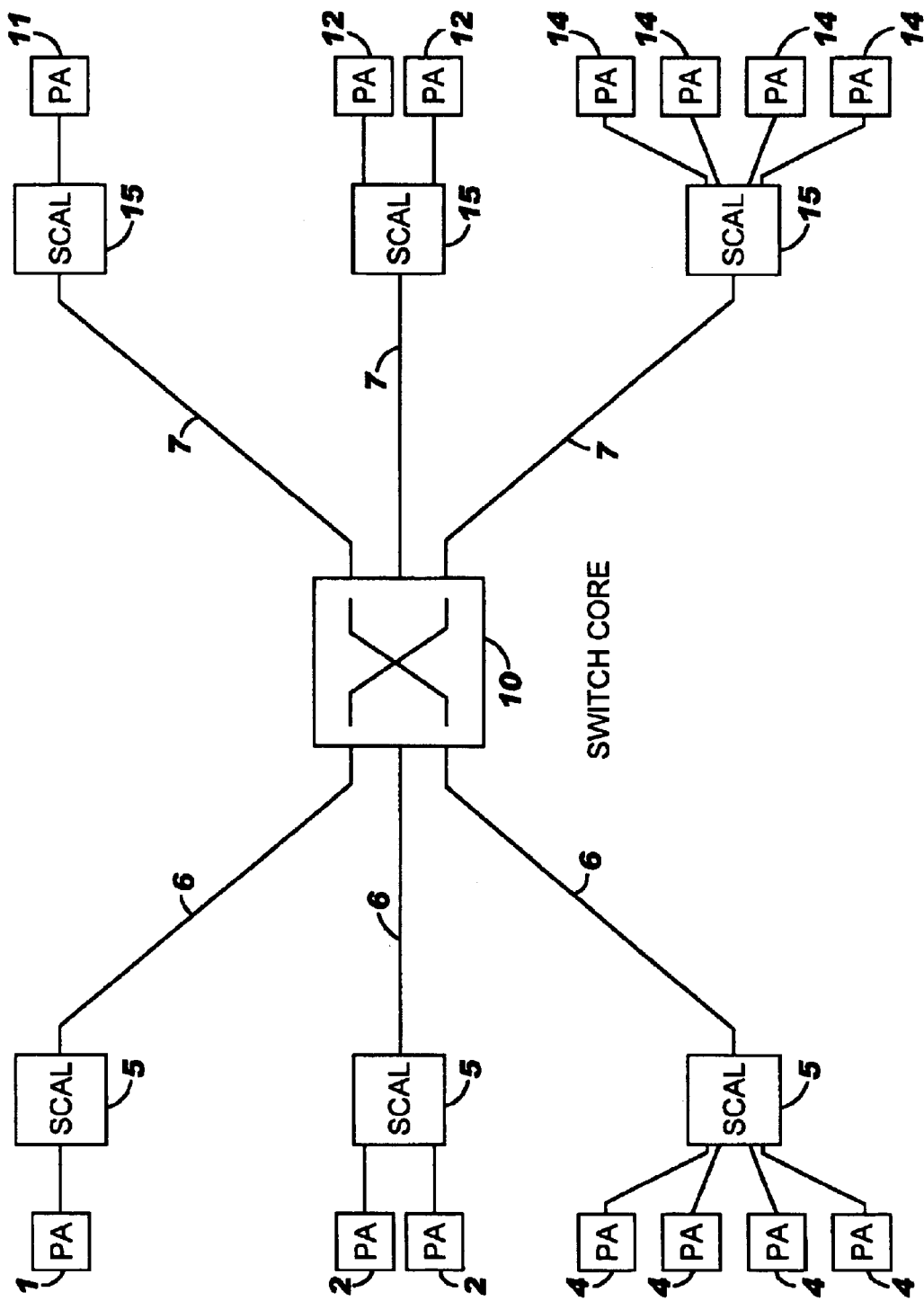
FIG. 1 illustrates a switching architecture where the invention can be advantageously embodied.

With respect to FIG. 1, there is shown a basic simplified switching architecture where a the Switch Core Access Layers (SCAL) element of the invention may be embodied. A switch core 10 is associated with different SCAL elements, each comprising a receive part 5 (often referred to as SCAL Receive element) and a transmit part 15 (SCAL Xmit element). Different Protocol Adapters operating at different speeds and at different formats may be attached. A high-speed Protocol Adapter 1 may be attached to one SCAL element and two identical medium-rate Protocol Adapters 2 may be attached to a second SCAL element. Further, four low-speed Protocol Adapters may be attached to a third SCAL element. Obviously the particular arrangement of FIG. 1 is only a particular embodiment which has been simplified for the sake of clarity. Any real configuration may be more complex as a function of the practical requirements of the user or the customer. In some situations, more than four Protocol Adapters could even be contemplated.

As the SCAL elements are remotely located with respect to Switch Core 10, a set of long-distance multi-serial links 6 and 7 are used, respectively for permitting the attachment to one input port and to one output port of Switch Core 10. Generally speaking, each long-distance multi-serial link comprises at least one wire, either optical or electrical, that is used for achieving high speed transmission at distances of several hundreds of meters. An additional set (not shown) of serializers and deserializers is used for performing the parallel to serial transformation on each of such wire. Such serial links are discussed in article "*Single-chip 4×500-MBd CMOS Transceiver*" in IEEE Journal of Solid-State Circuits, December 1996, Vol. 31; number 12 by A. X. Widmer et al. This article discloses the use of a 8B/10B coding in the serial data flow for enhancing the performance of the data transmission as well as the introduction of comma characters in empty cell cycles in order to allow the detection of the cell clock. This results in an absence of overhead since the length of the cell which contains data is not increased with the insertion of the comma synchronization character. This is particularly interesting and advantageous when small cells are processed and switched. It should be noticed that when the Switch Core is operating on a speed expansion mode, the number of different links forming a multi wire is generally fixed equal to the number of switching modules forming the Switch core 10 so that each byte can be dedicated to one switching module. In the preferred embodiment of the invention, four different modules are operating in parallel, and one acts as a master controlling the three remaining ones. The cell is split into four separate Logical Units, and each LU is directed to one particular switching module in accordance with the teaching of the above mentioned European patent application no. 97480057.5.

In accordance with the present invention, each SCAL element provides the bitmap field introduction that is required for the routing process within the Switch Core. The bitmap field is reserved for receiving, at different instants, the particular bitmap value that will control the next step of the routing process. The bitmap field receives a first bitmap value while entering the Switch Core for controlling the routing process within each switching module. Additionally, the bitmap field may receive a second bitmap value at the output level of the switch core, before the cell is transported through multi serial links 7 for enhancing multicasting possibilities even in the Xmit part of the SCAL element.

Generally speaking, when the Switch Core operates under control of a Master switching module, the bitmap field is introduced within Logical Unit LU0 that is directed to the master switching module.

With respect to FIG. 2, shown is how the bitmap is practically introduced in the Logical Unit when a low speed Protocol Adapter 4 is attached to the SCAL, and also when the Switch Core operates in a master/slave principle. Low speed Protocol Adapter 4 produces cells which are transmitted through a one_byte wide bus at the interface with the receive part 5 of the SCAL element. The cell comprises 58 successive bytes and is generally formed of a Switch Routing Header of three bytes (SRH1, SRH2, SRH3) which is a characteristic of the particular destination of the cell; and a payload carrying more particularly the data of the user (bytes P1 to P55). Preferably, the SRH may be divided into a first field (SRH1) dedicated to the control of the switch, a so called Cell qualifier, and a second field (SRH2 and SRH3) carrying a routing index characterizing a label corresponding to a list of destination Protocol Adapters. Also, the payload may use classical Frame Checking Sequences or error correcting bytes for preventing corruption in the cell. Such mechanisms are well known to the skilled man and will not be elaborated on.

In that situation, SCAL 5 has to elaborate four distinctive Logical Units for a total of 60 bytes (that is to say the 58 bytes of the original cell plus one 2-bytes bitmap). The arrangement of the Logical Units shows that the first Logical Unit (LU0) successively comprises the first bitmap field (BM1); the second bitmap field (BM2), byte number 4 of the payload (P4), byte number 8 (P8) etc. Also, the second Logical Unit comprises the first byte of the Switch Routing Header (SRH1), the fifth byte of the payload sequence (P5), the ninth byte of the payload (P9) etc.

The third LU comprises in sequence: SRH2 (second byte of the SRH), P2 (second byte of the payload), P6 (sixth byte of the payload) etc. At last the fourth LU is formed of the sequence SRH3, P3, P7, P11, etc.

This shows that a cell rearrangement is required for permitting the building of the different Logical Units.

FIG. 3 shows more particularly the cell rearrangement for a medium speed Protocol Adapter 2, the latter having an interface bus of two bytes with the SCAL element. This situation requires a new and different rearrangement for converting a two-bytes wide bus to the four Logical Units with bitmap field introduction.

With respect to FIG. 4, shown is the situation of the attachment of a high-speed Adapter through a four-bytes wide interface bus with the SCAL. In this case, the rearrangement must still permit the building of the four Logical Units.

The above mentioned examples, although simple, illustrate the great variety of the situations which may be found. In addition, it should be noticed that when the Switch Core does not operate on a master/slave basis for performing the routing process, the situation may still be different. Indeed, in that case, each Logical Unit should incorporate its own bitmap field for permitting the independent control process of the different modules forming the Switch Core. FIG. 5 illustrates the structure of the four LUs in that particular case.

Obviously, once the cell has been switched by Switch Core 10 and arrives to the Xmit part 15 of the SCAL element, an additional cell rearrangement has to be achieved again in order to reestablish the cell in the same state that it was when it entered into the SCAL receive part. This implies the extraction of the bitmap field, and the reestablishment of the appropriate number of bytes (one, two or four) required by the interface bus(ses) between the SCAL and the Protocol Adapters.

Figure 6:
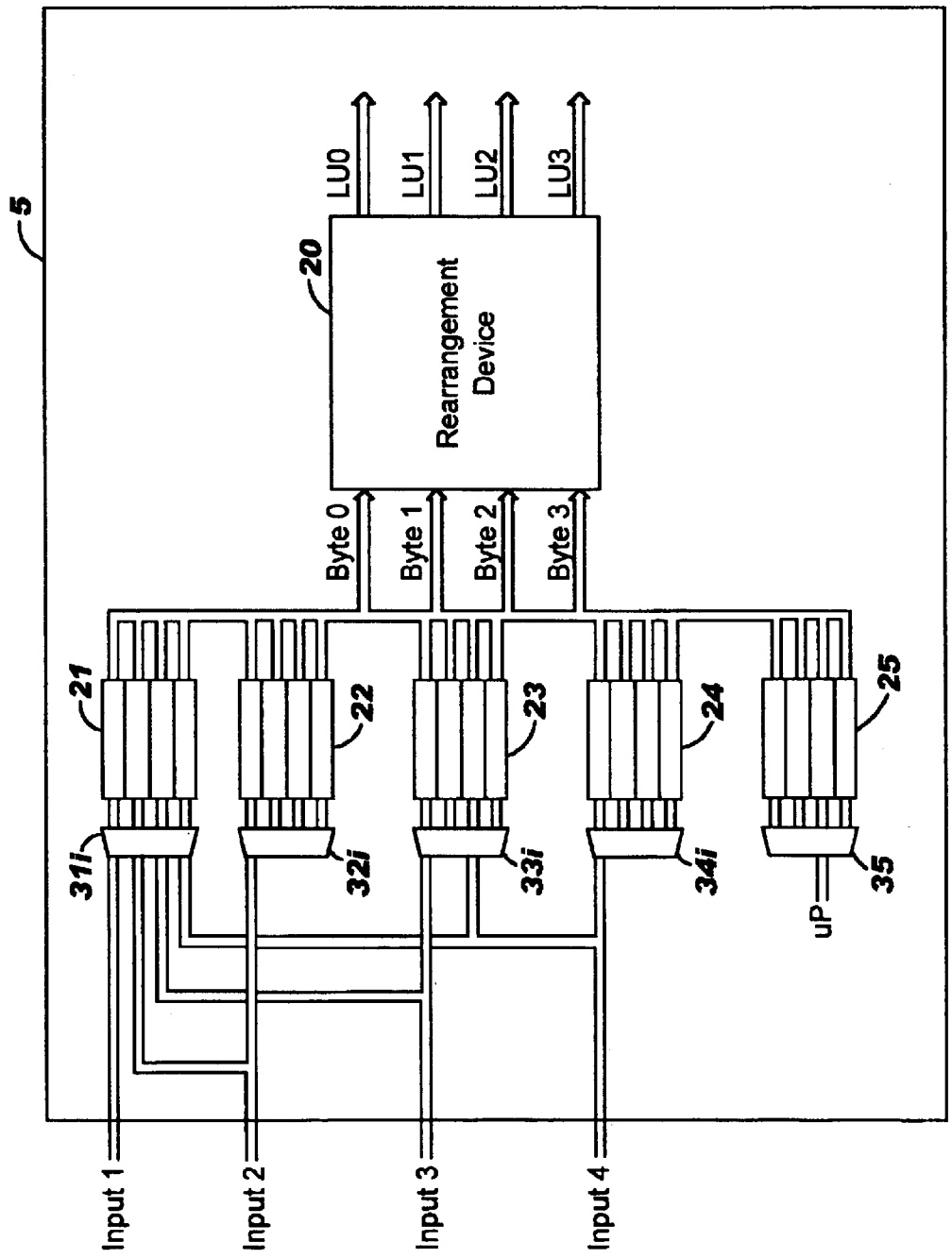
FIG. 6 shows the structure of the receive part 5 of a SCAL element in accordance with the present invention.

The programmable SCAL element in accordance with the present invention achieves the cell rearrangement for a wide number of combinations. Additionally, it remains compatible with the high speeds which are involved in the speed expansion technique. FIG. 6 illustrates the basic structure of a Receive part 5 of a SCAL element. Receive part 5 of the SCAL has four input bus for respectively permitting the attachment of one, two or four Protocol Adapters in accordance with the present invention. Each input is designed to receive data from a one_byte bus and is connected to a set of four FIFO queues 21–24 via a set of selectors or multiplexors 31i–34i.

More particularly, Input 1 of receive part 5 of SCAL is connected to a first set of FIFOs 21 via a selector 31i which has a second, a third and a fourth input bus which are respectively connected to the second, third and fourth input of the Receive part 5. Selector 31i has four outputs which are respectively connected to the different queues of the first set of FIFOs 21.

Input 2 is connected to a second set of FIFO queues 22 via a selector 32i which four outputs are respectively connected to one FIFO queue of said second set of FIFOs 22. Input 3 bus is connected to a third set of FIFO queues 23 via a selector 33i having a second input receiving the byte coming from Input 4. Selector 33i has four outputs that are respectively connected to one FIFO queue of the set of FIFOs 23.

At last, Input 4 is connected to a fourth set of FIFO queues 24 via a selector 34i which also has four outputs communicating with one FIFO queue of the set of FIFO 24. The sets of FIFO queues 21–24 allow the appropriate adaptation in accordance with the type of adapter which is connected.

In the case of a high-speed adapter, the interface between the adapter and the SCAL is formed by a 4_bytes wide bus, the latter being divided into four 1_byte busses for allowing connection to the four inputs of SCAL receive Element 5. Selector 31i is controlled so as to achieve the loading of the cell into the same set of FIFOs 21. The remaining sets of FIFOs are unused in that case.

When two medium speed Protocol Adapters are connected, the interface is formed of a two_bytes bus. The first Protocol Adapter is thus connected to Input 1 and Input 2 of the SCAL receive element 5; while the second Protocol Adapter gets attachment to the SCAL via Input 3 and Input 4. In that situation, only FIFO queues 21 and 23 are used, respectively for storing the cell coming from the first or second Adapter. Obviously, the selection results from the appropriate control of selectors 31i–34i. The FIFO queues 21 and 23 are read alternately, and their contents (Byte 0, Byte 1, Byte 2, Byte 3) form an internal 4-bytes data path which is transmitted to rearrangement device 20.

At last, when four low-speed Protocol Adapters are to be attached, a one_byte bus which is connected to a corresponding input of SCAL receive element 5 is used. In that case, each set of FIFO queues is assigned to one adapter and the whole set of queues is used. More particularly, the FIFO queues 21–24 are read in a regular round robin fashion, and their contents (Byte 0, Byte 1, Byte 2 and Byte 3) form an internal 4_bytes data path which is transmitted to Rearrangement device 20.

In the present invention, the sets of FIFOs present the function of preparing the cell being received to convert it in order for transferring it over a 4 bytes wide bus, as a preliminary step in the perspective of the construction of the four logical units.

Additionally, these FIFOs achieve a clock isolation between the adapters and the switch, and permit the former to have a speed that is less or equal to the switch speed.

In addition to the FIFOs 21–24, a fifth set of FIFO queues 25 is used for generating cells created by an internal microprocessor for the purpose of routing control.

Rearrangement device 20 performs the process of bytes rearrangement between the internal data path, at the output of FIFOs 21–25, and provide the arrangement of cells before they are presented in Logical Units prior to their transmission over multi serial links 6.

Figure 7:
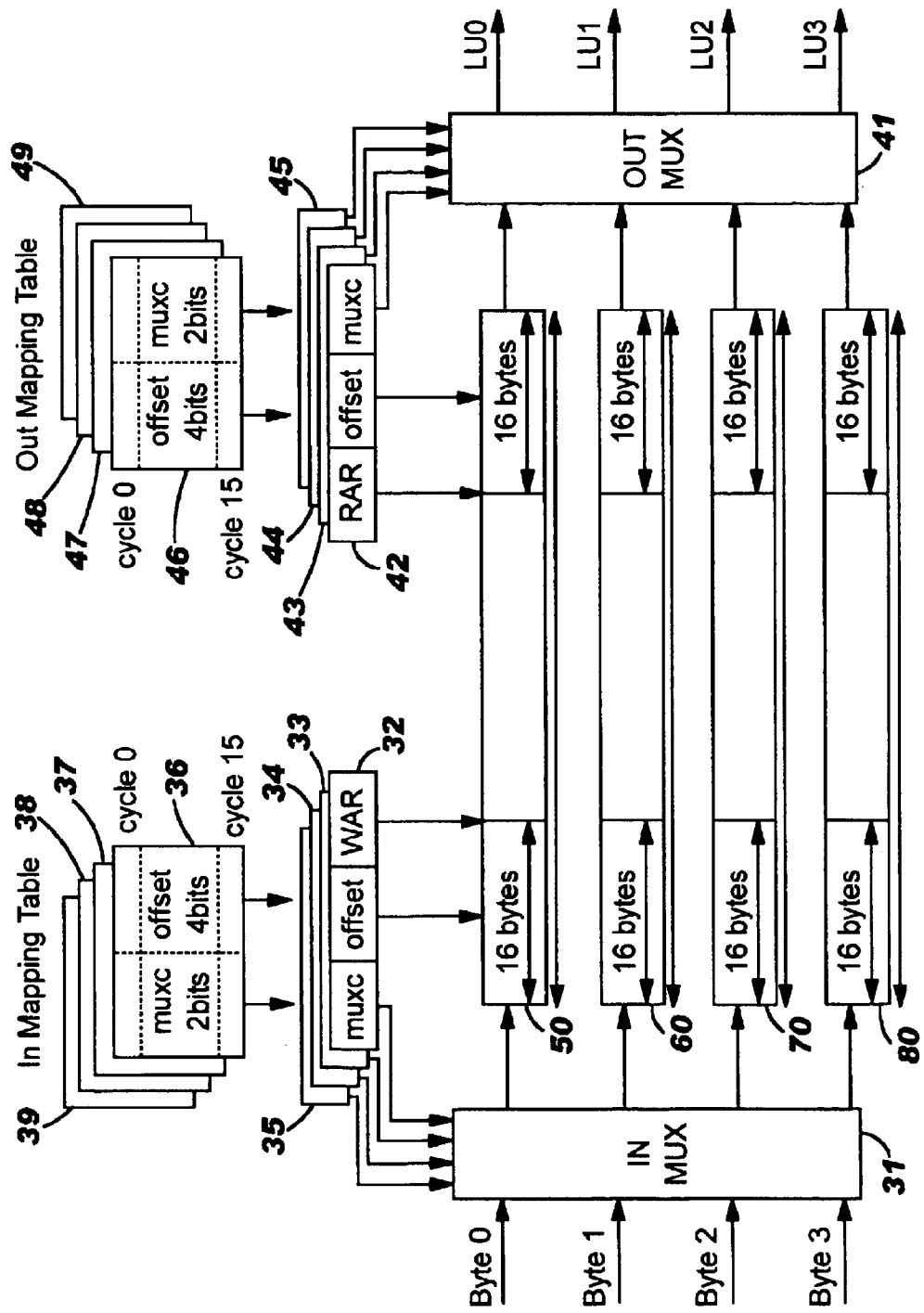
FIG. 7 illustrates the basic structure of the rearrangement device 20 in accordance with the present invention.

With respect to FIG. 7, shown is the preferred embodiment of Rearrangement device 20 used in the Receive part of the SCAL element. Rearrangement device 20 comprises a set of RAM elements 50, 60, 70 and 80, each having mx 16 bytes, e.g. m=256. The set of RAMs permits to adapt the possibilities given by the actual technology to the speed requirements. Each RAM is normally associated with a Logical Unit path, that is to say that each RAM will normally be loaded as often as possible, with the bytes that are normally to be directed to a given Logical Unit. FIG. 7 shows that RAM 50 is normally associated to Logical Unit LU0, while RAM 60 is normally associated to LU1.

Similarly, RAM 70 and 80 are respectively associated with the Logical Units LU2 and LU3. Because of this association, the number of RAMs is generally the same as the number of Logical Units, although this is not necessary. In addition to RAM elements 50–80, the Rearrangement device comprises a first IN_Mux multiplexing device 31 which receives the four bytes of the internal 4_bytes wide bus carrying the contents of the FIFOs 21–25. In accordance with the values stored into four control Registers 32, 33, 34 and 35, each register being dedicated to the control of one particular input. Multiplexing device 31 can transmit the considered input to any location within one particular RAM storage 50–80.

In the present invention, each cell is comprised of up to 64 bytes. Therefore, since four RAM are provided, the writing and the read operations on one cell requires a set of 16 elementary cycles.

Rearrangement device 20 further includes a set of four In_mapping tables 36, 37, 38, 39 which are respectively affected to the control process of one input bus of the In_Mux multiplexing device 31. Each In_mapping table may store 16 control words, with each control word being used for controlling a corresponding input of IN_Mux 31 during one elementary cycle. The first word controls the first cycle, the second word controls the second cycle etc. The whole processing of the cell, during 16 cycles, then involves the sixteen control words loaded into the In_mapping tables 36–39. Each control word stored in the In_mapping tables comprises two distinctive fields:

a MUXc multiplexing control field having two bits;

an OFFSET field of four bits which is used for determining the accurate location of the writing of the current byte within the 16 bytes stored by the considered RAM storage.

Similarly, Rearrangement device includes a second multiplexing device 41 (Out_Mux) which is able to simultaneously extract four bytes, one from each RAM 50–80 and present them on the Logical Unit outputs in accordance with the contents carried by four control registers 42, 43, 44 and 45. Each one of control registers 42–45 carries a control word that contains two fields (OFFSET and MUXc) extracted from one associated OUT mapping tables 46, 47, 48 and 49 which may store up to 16 control words. Each control word produced by one OUT_mapping table 46–49 complies with the same format as for the IN_mapping tables, that is to say, comprises a MUXc control field for controlling the OUT_Mux multiplexing device 41, and an OFFSET field dedicated to define the appropriate location where to read the byte being extracted by OUT_Mux multiplexing device.

The rearrangement device 20 operates as follows:

During the first cycle, the first four bytes of the incoming cell are presented at the four input busses of IN_Mux multiplexing device 31. The first words in the IN-Mapping tables 36 to 39 are read for the respective loading of the MUXc and OFFSET fields into control registers 32, 33, 34 and 35. Control registers 32–35 additionally comprise a Write Address Register (WAR) field that is associated to a incrementing process at every cell cycle. Basically, the contents stored into the WAR field define a cell buffer, and correspond to the MSB of the storing address of the cell.

The first input of the IN_Mux circuit 31 receives the first byte of the cell (i.e., SRH1, see FIG. 2). The IN Mapping table 36 provides the MUXc and OFFSET values that correspond to cycle 0. This byte (SRH1) is then loaded into the RAM storage 50–80 that is defined by the MUXc value, into the cell buffer defined by the current value of WAR, at the particular position within said cell buffer which is defined by the value of OFFSET. With respect to FIG. 2, there is shown that the first byte; i.e., SRH1, should appear in the first position of Logical Unit LU1. Therefore, the first control word of In_Mux table 31 causes the loading of the SRH1 into RAM storage 60 (associated to LU1), at its first position.

Simultaneously, the second input of IN_Mux multiplexing device 31 receives the second byte (SRH2) of the cell. The latter is stored into the RAM storage that is defined by the control word extracted from IN_Mapping table 37, and loaded into register 33. The appropriate RAM storage is defined by the particular value of MUXc field, the cell buffer is defined by the WAR field, and the particular location within the cell buffer is given by the Offset value. With respect to FIG. 2, it appears that SRH2 has to be loaded into RAM 70 (associated to LU2) at its first position. Simultaneously, the third input of In_Mux multiplexing device 31 receives the third byte (SRH3) of the cell. Again, the control word extracted from IN_Mapping table 38 permits the loading of the MUXc and OFFSET field into Register 34, and the WAR field defines the position of the current cell. Therefore, the third byte of the cell; i.e., SRH3, is loaded into RAM 80.

Simultaneously, at last, the fourth input of In_Mux multiplexing device 31 receives the fourth byte of the cell, which is the first byte P1 of the payload. It appears from FIG. 2 that particular byte should appear as the second element of Logical Unit LU1, that is to say should be loaded into the associated RAM 60, which is already used for a Write operation for SRH1. Therefore, it appears that during the first cell cycle, two bytes should be stored into a same RAM storage, because those two bytes are directed to be transported on a same Logical Unit. This situation may occur sometimes and results in a contention because the four input leads of the IN_Mux multiplexing device 31 must be processed at the same time. This is an important problem to which the invention brings a solution, which is essential in view of the high speed of the speed expansion architecture.

In the invention, when two bytes which are processed in parallel have to be loaded at the same time in the same RAM storage 50–80, one particular byte is accidentally stored into another RAM being available, at a location which is also available. This causes an alteration to the normal association between the four RAMs 50–80 and the four Logical Units.

Therefore, with the invention, the first byte of the payload which is presented at the fourth input of IN_Mux multiplexing device 31 is loaded into RAM 50 since it appears that the latter does not perform any write operation.

The processing of the first cycle then completes and the process proceeds with the second cycle. Similarly, four bytes are simultaneously presented at the four inputs of IN_Mux multiplexing device 31. These bytes represent four consecutive bytes of the entering cell, which bytes are stored in one set of FIFO corresponding to one Protocol Adapter being attached. As for the processing of the first cycle, each byte presented at one input of IN_Mux 31 is directed to the appropriate RAM storage 50–80 that is associated to the normal destination Logical Unit. When the cell rearrangement scheme shows that two bytes should normally be loaded into a same RAM storage, because they are to be transported in a same Logical Unit, the control word extracted from IN_Mapping tables 36–39 causes an alteration of the normal loading process, and the second byte is loaded into the last RAM that remains available for a Write operation.

Because of the alterations that were brought to the normal loading of the RAMs 50–80, the latter cannot be directly used for performing the Logical Units construction. Indeed, although most of the bytes of the Logical Unit LU0 for instance are stored into RAM 50, it appears that, because of the above mentioned contention problem, some isolated bytes were loaded into another RAM.

The purpose of the OUT_Mux multiplexing device 41 is to correct that situation and to re-establish the right Logical Units from the contents of the RAM 50–80. To achieve this, the contents of the four OUT_Mapping Tables 46–49 are chosen so as to achieve complementary read process with respect to the write process performed under control of IN_Mapping Tables 36–39, whereby the alterations which were brought during the storage of the cell can be reestablished.

Considering, for instance, the <<wrong>> position of the P1 byte which had to be stored within RAM 50 instead of RAM 60 which was the normally associated RAM to the Logical Unit LU1. During the first cycle of the output process, the control word of OUT_Mapping table 46 contains a MUXc field defining the second output of OUT_MUX 41, at the appropriate OFFSET location within the current cell buffer defined by Read Address Register (RAR), so that the P1 byte can still be retrieved and routed to the right Logical Unit LU0. For any other cycle the process is similar: OUT_Mapping tables 49 provides OFFSET and MUXc values for every input of OUT_Mux multiplexing circuit so that the bytes that are located into a RAM that is normally associated to a Logical Unit be directed to the latter in a transparent manner. However, for the rare bytes which are located in a wrong place, that is to say in RAMs that are not associated to the Logical Unit to which they belong, the Out_Mapping tables produce control value that permit to reestablish the normal position of these bytes with respect to the Logical Units. In this way, no cycle clock is wasted and the RAM storage is used with a higher level of efficiency.

Obviously, the structure of the receive part of the SCAL was particularly elaborated on. With respect to the Xmit part, a similar structure is to be provided, for permitting the conversion of the four logical units, into the format of the internal data path having four bytes wide. To achieve this, a rearrangement device having an identical and symmetric structure with respect to that of the receive part is used. The contents of the IN_Mapping Tables and the Out_Mapping tables are adapted in order to achieve the bitmap extraction instead of the bitmap introduction.

Since the SCAL element is controlled by means of the IN_mapping and Out_mapping tables, the latter are very easily programmable and therefore versatile enough to permit easy adaptation.

While the invention has been described in terms of preferred embodiments, those skilled in the art will recognize that the invention can be practiced with modification within the spirit and scope of the appended claims.

Having thus described our invention, what we claim is as follows:

1. In a switching apparatus comprising a centralized Switch Core (10) comprising a set of n input ports receiving cells which are routed to a set of n output ports, and at least one Switch Core Access Layer (SCAL) element for the attachment of Adapters; said Switch Core and said SCAL communicating via n parallel serial links transmitting corresponding Logical Units (LU);

characterized in that each SCAL comprises:
at least one input for receiving cells from said Adapter;
n FIFO queues (21–25);
n RAM storages, with each RAM being associated with one Logical Unit;
first multiplexor (31) receiving the contents of a set of parallel busses for performing simultaneously n WRITE operations into said n RAM storages under the control of a first set of n tables (IN_Mapping tables 36–39); and
second multiplexor (41) for making READ operations from said n RAM storages under control of a second set of n tables (OUT_Mapping Tables, 46–49), said first and second set of n tables having complementary control words so that the cell being conveyed through said first multiplexor, said RAM and said second multiplexor is being subject to a cell rearrangement enabling introduction of at least one bitmap field, thereby producing said Logical Units.

2. The switching apparatus according to claim 1 characterized in that said first set of n tables controls said first multiplexor (31) so that when two bytes which are processed in parallel have to be loaded at the same time in the same RAM storage (50–80) because they are intended to be transported In the same associated Logical Unit, one particular byte is stored into another RAM available for a Write operation, thereby causing an alteration to the normal association between said n RAMs and said n Logical Units, and said second set of n tables cause the re-establishment of said alteration when the n bytes are extracted by said second multiplexor (41).

3. The switching apparatus according to claim 2 characterized in that n is equal to four and said first multiplexor (31) is controlled by means of a set of four control Registers (32, 33, 34, 35), each register comprising a first field (MUXC) defining in which RAM the associated input byte will be written, a second field (OFFSET) defining the particular location to store said byte, and a third field for storing an incrementing value (WAR), and in that said first and second fields are provided by said first set of n tables.

4. The switching apparatus according to claim 3 characterized in that each SCAL further comprises:
a first, a second, a third and a fourth inputs for the attachment of Protocol Adapters;
a first, a second, a third and a fourth sets of four FIFOs (21–24) which are respectively dedicated to said first, second, third and fourth inputs;
each FIFO (21–24) being exclusively and respectively affected to the storage of cells coming from four low-speed Protocol Adapters attached to said SCAL;
the four queues of said first set of FIFO (21) being exclusively used when a unique high-speed Protocol Adapter is attached to the SCAL; and
said first FIFO (21) and said third FIFO (23) being exclusively used when two medium speed Protocol Adapters are respectively connected to said first and second inputs on the one hand, and said third and fourth inputs on the other hand.

5. The switching apparatus according to claim 4 characterized in that said second multiplexor (41) has four outputs and is controlled by means of a second set of control Registers (42, 43, 44, 45), each register comprising a first field (MUXc) defining to which outputs the byte will be read into the associated RAM, a second field (OFFSET) defining the particular location where to read the byte, and a third field for storing an incrementing value (RAR); said first and second field being provided by the corresponding one of said second n tables (OUT_Mapping, 46–49);
whereby each output produces a corresponding Logical Unit which can be transmitted to said Switch Core.

6. The switching apparatus according to claim 5 characterized in that the SCAL comprises an additional fifth set of FIFO that can store bytes produced by a local microprocessor for the purpose of generating service cells.

7. Switching apparatus according to claim 6 characterized in that one bitmap field Is introduced in every Logical unit which is to be transported to a Switch Core having independent switching modules.

8. The switching apparatus according to claim 6 characterized in that said switch core operates under the control of a master switching module receiving the Logical Unit carrying the bitmap field.

9. A device for attaching adapters to a switch comprising:

At least one Input for receiving cells;

n FIFO queues (21–25);

n RAM storages, with each RAM being associated with one Logical Unit;

first multiplexor (31) receiving the contents of a set of parallel busses for performing simultaneously n WRITE operations into said n RAM storages under the control of a first set of n tables (IN_Mapping tables 36–39); and second multiplexor (41) for making READ) operations from said n RAM storages under control of a second set of n tables (OUT_Mapping Tables, 46–49), said first and second set of n tables having complementary control words so that the cell being conveyed through said first multiplexor, said RAM and said second multiplexor is being subject to a cell rearrangement enabling introduction of at least one bitmap field, thereby producing n Logical Units.

* * * * *